US009699609B2

(12) United States Patent
Dupray et al.

(10) Patent No.: US 9,699,609 B2
(45) Date of Patent: *Jul. 4, 2017

(54) NETWORK SERVICES DEPENDENT UPON GEOGRAPHICAL CONSTRAINTS

(71) Applicant: Dennis J. Dupray, Golden, CO (US)

(72) Inventors: Dennis J. Dupray, Golden, CO (US); Sheldon F. Goldberg, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/791,387

(22) Filed: Jul. 3, 2015

(65) Prior Publication Data

US 2016/0007159 A1  Jan. 7, 2016

Related U.S. Application Data

(63) Continuation of application No. 14/228,951, filed on Mar. 28, 2014, now Pat. No. 9,078,101, which is a
(Continued)

(51) Int. Cl.
*H04W 4/02* (2009.01)
*H04L 29/08* (2006.01)
(Continued)

(52) U.S. Cl.
CPC ............ *H04W 4/023* (2013.01); *G06Q 30/02* (2013.01); *G06Q 50/34* (2013.01);
(Continued)

(58) Field of Classification Search
CPC .... G06Q 30/02; G06Q 50/34; G07F 17/3288; H04M 2242/14; H04M 2242/15;
(Continued)

(56) References Cited

U.S. PATENT DOCUMENTS 3,646,580 A  2/1972  Fuller et al.
3,886,553 A  5/1975  Bates
(Continued)

FOREIGN PATENT DOCUMENTS

EP  0177203  4/1986
EP  0546758  6/1993
(Continued)

OTHER PUBLICATIONS

U.S. Appl. No. 08/191,984, filed Feb. 4, 1994, Loomis.
(Continued)

*Primary Examiner* — Kashif Siddiqui

(57) ABSTRACT

A method and system are disclosed for determining the geographic location of a user communicating on a communications network such as the Internet. In one embodiment, a provider of a product or service: (a) receives the user's phone number (or other identification for contacting the user's station), and (b) supplies the user's station with a distinctive identifier. The provider of the product or service then supplies a location determining service (or location service provider) with the user's phone number (or other identification). A phone call is made to the phone number by the location determining service (or location service provider) for retrieving the distinctive identifier from the network station having the phone number. If the distinctive identifier is retrieved and the location determining service (or location service provider) determines that the user's station is within an appropriate geographical area (or not within an inappropriate area), then the provider of the product or service can provide the requested product or service to the user.

35 Claims, 3 Drawing Sheets

Related U.S. Application Data continuation of application No. 13/561,846, filed on Jul. 30, 2012, now Pat. No. 8,694,025, which is a continuation of application No. 10/857,565, filed on May 28, 2004, now abandoned, which is a continuation of application No. 09/669,255, filed on Sep. 25, 2000, now abandoned.

(60) Provisional application No. 60/156,066, filed on Sep. 24, 1999.

(51) Int. Cl.

| | | |
|---|---|---|
| *G06Q 30/02* | (2012.01) | |
| *G06Q 50/34* | (2012.01) | |
| *G07F 17/32* | (2006.01) | |
| *H04M 3/487* | (2006.01) | |
| *H04M 3/493* | (2006.01) | |
| *H04M 3/42* | (2006.01) | |
| *H04W 8/08* | (2009.01) | |

(52) U.S. Cl.
CPC .......... *G07F 17/3288* (2013.01); *H04L 67/16* (2013.01); *H04L 67/18* (2013.01); *H04M 3/4228* (2013.01); *H04M 3/42229* (2013.01); *H04M 3/4878* (2013.01); *H04M 3/493* (2013.01); *H04W 4/02* (2013.01); *H04M 3/42059* (2013.01); *H04M 2242/14* (2013.01); *H04M 2242/15* (2013.01); *H04M 2242/30* (2013.01); *H04W 8/08* (2013.01)

(58) Field of Classification Search
CPC ......... H04M 2242/30; H04M 3/42059; H04M 3/42229; H04M 3/4228; H04M 3/4878; H04M 3/493; H04W 4/02; H04W 4/023; H04W 8/08
See application file for complete search history.

(56) References Cited

U.S. PATENT DOCUMENTS

| | | |
|---|---|---|
| 4,023,176 A | 5/1977 | Currie et al. |
| 4,232,313 A | 11/1980 | Fleishman |
| 4,347,618 A | 8/1982 | Kavouras et al. |
| 4,438,439 A | 3/1984 | Shreve |
| 4,475,010 A | 10/1984 | Huensch et al. |
| RE31,962 E | 7/1985 | Brodeur |
| 4,542,744 A | 9/1985 | Barnes et al. |
| 4,630,057 A | 12/1986 | Martin |
| 4,636,795 A | 1/1987 | Dano |
| 4,651,157 A | 3/1987 | Gray et al. |
| 4,670,758 A | 6/1987 | Campbell |
| 4,700,374 A | 10/1987 | Bini |
| 4,721,958 A | 1/1988 | Jenkin |
| 4,740,792 A | 4/1988 | Sagey et al. |
| 4,742,357 A | 5/1988 | Rackley |
| 4,775,937 A | 10/1988 | Bell |
| 4,799,062 A | 1/1989 | Sanderford, Jr. et al. |
| 4,857,840 A | 8/1989 | Lanchais |
| 4,860,352 A | 8/1989 | Laurance et al. |
| 4,864,313 A | 9/1989 | Konneker |
| 4,870,576 A | 9/1989 | Tornetta |
| 4,876,550 A | 10/1989 | Kelly |
| 4,879,713 A | 11/1989 | Ichiyoshi |
| 4,888,593 A | 12/1989 | Friedman et al. |
| 4,914,689 A | 4/1990 | Quade et al. |
| 4,952,772 A | 8/1990 | Zana |
| 4,990,922 A | 2/1991 | Young et al. |
| 4,992,796 A | 2/1991 | Apostolos |
| 5,003,317 A | 3/1991 | Gray et al. |
| 5,003,595 A | 3/1991 | Collins et al. |
| 5,008,679 A | 4/1991 | Effland et al. |
| 5,017,926 A | 5/1991 | Ames et al. |
| 5,032,989 A | 7/1991 | Tornetta |
| 5,034,898 A | 7/1991 | Lu et al. |
| 5,043,736 A | 8/1991 | Darnell et al. |
| 5,045,852 A | 9/1991 | Mitchell et al. |
| 5,045,861 A | 9/1991 | Duffett-Smith |
| 5,055,851 A | 10/1991 | Sheffer |
| 5,058,152 A | 10/1991 | Solomon et al. |
| 5,083,272 A | 1/1992 | Walker et al. |
| 5,092,343 A | 3/1992 | Spitzer et al. |
| 5,099,245 A | 3/1992 | Sagey |
| 5,111,209 A | 5/1992 | Toriyama |
| 5,119,102 A | 6/1992 | Barnard |
| 5,119,104 A | 6/1992 | Heller |
| 5,119,295 A | 6/1992 | Kapur |
| 5,136,686 A | 8/1992 | Koza |
| 5,142,590 A | 8/1992 | Carpenter et al. |
| 5,155,490 A | 10/1992 | Spradley, Jr. et al. |
| 5,163,004 A | 11/1992 | Rentz |
| 5,166,694 A | 11/1992 | Russell et al. |
| 5,177,489 A | 1/1993 | Hatch |
| 5,184,347 A | 2/1993 | Farwell et al. |
| 5,191,342 A | 3/1993 | Alsup et al. |
| 5,193,110 A | 3/1993 | Jones et al. |
| 5,208,756 A | 5/1993 | Song |
| 5,212,765 A | 5/1993 | Skeirik |
| 5,212,804 A | 5/1993 | Choate |
| 5,214,789 A | 5/1993 | George |
| 5,216,611 A | 6/1993 | McElreath |
| 5,218,367 A | 6/1993 | Sheffer et al. |
| 5,218,618 A | 6/1993 | Sagey |
| 5,218,716 A | 6/1993 | Comroe et al. |
| 5,223,844 A | 6/1993 | Mansell et al. |
| 5,225,842 A | 7/1993 | Brown et al. |
| 5,233,541 A | 8/1993 | Corwin et al. |
| 5,235,633 A | 8/1993 | Dennison et al. |
| 5,243,530 A | 9/1993 | Stanifer et al. |
| 5,251,273 A | 10/1993 | Betts et al. |
| 5,260,711 A | 11/1993 | Sterzer |
| 5,278,892 A | 1/1994 | Bolliger et al. |
| 5,280,295 A | 1/1994 | Kelley et al. |
| 5,280,472 A | 1/1994 | Gilhousen et al. |
| 5,282,261 A | 1/1994 | Skeirik |
| 5,293,642 A | 3/1994 | Lo |
| 5,293,645 A | 3/1994 | Sood |
| 5,295,180 A | 3/1994 | Vendetti et al. |
| 5,311,195 A | 5/1994 | Mathis et al. |
| 5,317,323 A | 5/1994 | Kennedy et al. |
| 5,319,374 A | 6/1994 | Desai et al. |
| 5,325,419 A | 6/1994 | Connolly et al. |
| 5,327,144 A | 7/1994 | Stilp et al. |
| 5,331,550 A | 7/1994 | Stafford et al. |
| 5,349,631 A | 9/1994 | Lee |
| 5,359,521 A | 10/1994 | Kyrtsos et al. |
| 5,363,110 A | 11/1994 | Inamiya |
| 5,365,447 A | 11/1994 | Dennis |
| 5,365,450 A | 11/1994 | Schuchman et al. |
| 5,365,516 A | 11/1994 | Jandrell |
| 5,365,544 A | 11/1994 | Schilling |
| 5,373,456 A | 12/1994 | Ferkinhoff et al. |
| 5,373,546 A | 12/1994 | Holzermer |
| 5,377,267 A | 12/1994 | Suzuki et al. |
| 5,379,224 A | 1/1995 | Brown et al. |
| 5,388,147 A | 2/1995 | Grimes |
| 5,388,259 A | 2/1995 | Fleischman et al. |
| 5,389,934 A | 2/1995 | Kass |
| 5,390,339 A | 2/1995 | Bruckert et al. |
| 5,392,052 A | 2/1995 | Eberwine |
| 5,394,158 A | 2/1995 | Chia |
| 5,394,435 A | 2/1995 | Weerackody |
| 5,395,366 A | 3/1995 | D'Andrea et al. |
| 5,398,302 A | 3/1995 | Thrift |
| 5,402,520 A | 3/1995 | Schnitta |
| 5,402,524 A | 3/1995 | Bauman et al. |
| 5,408,586 A | 4/1995 | Skeirik |
| 5,408,588 A | 4/1995 | Ulug |
| 5,410,737 A | 4/1995 | Jones |
| 5,420,914 A | 5/1995 | Blumhardt |
| 5,422,813 A | 6/1995 | Schuchman et al. |
| 5,426,745 A | 6/1995 | Baji et al. |

(56) References Cited

U.S. PATENT DOCUMENTS

| | | |
|---|---|---|
| 5,434,927 A | 7/1995 | Brady et al. |
| 5,438,644 A | 8/1995 | Fu |
| 5,438,688 A | 8/1995 | Masaki |
| 5,444,451 A | 8/1995 | Johnson et al. |
| 5,448,754 A | 9/1995 | Ho et al. |
| 5,457,736 A | 10/1995 | Cain et al. |
| 5,461,390 A | 10/1995 | Hoshen |
| 5,465,082 A | 11/1995 | Chaco |
| 5,473,602 A | 12/1995 | McKenna et al. |
| 5,479,397 A | 12/1995 | Lee |
| 5,479,482 A | 12/1995 | Grimes |
| 5,485,163 A | 1/1996 | Singer et al. |
| 5,502,757 A | 3/1996 | Bales et al. |
| 5,506,864 A | 4/1996 | Schilling |
| 5,508,707 A | 4/1996 | LeBlanc et al. |
| 5,508,708 A | 4/1996 | Ghosh et al. |
| 5,510,801 A | 4/1996 | Engelbrecht et al. |
| 5,512,908 A | 4/1996 | Herrick |
| 5,513,111 A | 4/1996 | Wortham |
| 5,513,243 A | 4/1996 | Kage |
| 5,513,246 A | 4/1996 | Jonsson et al. |
| 5,515,285 A | 5/1996 | Garrett, Sr. et al. |
| 5,515,378 A | 5/1996 | Roy, III et al. |
| 5,515,419 A | 5/1996 | Sheffer |
| 5,517,667 A | 5/1996 | Wang |
| 5,519,760 A | 5/1996 | Borkowski et al. |
| 5,526,001 A | 6/1996 | Rose et al. |
| 5,526,357 A | 6/1996 | Jandrell |
| 5,526,466 A | 6/1996 | Takizawa |
| 5,537,460 A | 7/1996 | Holliday, Jr. et al. |
| 5,546,445 A | 8/1996 | Dennison et al. |
| 5,555,257 A | 9/1996 | Dent |
| 5,555,286 A | 9/1996 | Tendler |
| 5,559,520 A | 9/1996 | Barzegar et al. |
| 5,561,704 A | 10/1996 | Salimando |
| 5,563,611 A | 10/1996 | McGann et al. |
| 5,563,931 A | 10/1996 | Bishop et al. |
| 5,564,079 A | 10/1996 | Olsson |
| 5,570,412 A | 10/1996 | LeBlanc |
| 5,572,218 A | 11/1996 | Cohen et al. |
| 5,574,648 A | 11/1996 | Pilley |
| 5,577,169 A | 11/1996 | Prezioso |
| 5,579,535 A | 11/1996 | Orlen et al. |
| 5,581,490 A | 12/1996 | Ferkinhoff et al. |
| 5,581,596 A | 12/1996 | Hogan |
| 5,583,513 A | 12/1996 | Cohen |
| 5,583,517 A | 12/1996 | Yokev et al. |
| 5,583,916 A | 12/1996 | Maenpaa |
| 5,588,038 A | 12/1996 | Snyder |
| 5,592,180 A | 1/1997 | Yokev et al. |
| 5,594,425 A | 1/1997 | Ladner et al. |
| 5,594,740 A | 1/1997 | LaDue |
| 5,594,782 A | 1/1997 | Zicker et al. |
| 5,596,625 A | 1/1997 | LeBlanc |
| 5,600,705 A | 2/1997 | Maenpaa |
| 5,600,706 A | 2/1997 | Dunn et al. |
| 5,602,903 A | 2/1997 | LeBlanc et al. |
| 5,604,765 A | 2/1997 | Bruno et al. |
| 5,608,410 A | 3/1997 | Stilp et al. |
| 5,610,815 A | 3/1997 | Gudat et al. |
| 5,610,972 A | 3/1997 | Emery et al. |
| 5,611,704 A | 3/1997 | Kamizono et al. |
| 5,612,703 A | 3/1997 | Mallinckrodt |
| 5,613,041 A | 3/1997 | Keeler et al. |
| 5,613,205 A | 3/1997 | Dufour |
| 5,614,914 A | 3/1997 | Bolgiano et al. |
| 5,617,565 A | 4/1997 | Augenbraun et al. |
| 5,618,232 A | 4/1997 | Martin |
| 5,619,522 A | 4/1997 | Dube |
| 5,619,552 A | 4/1997 | Karppanen et al. |
| 5,621,848 A | 4/1997 | Wang |
| 5,625,668 A | 4/1997 | Loomis et al. |
| 5,625,748 A | 4/1997 | McDonough et al. |
| 5,627,547 A | 5/1997 | Ramaswamy et al. |
| 5,629,707 A | 5/1997 | Heuvel et al. |
| 5,631,469 A | 5/1997 | Carrieri et al. |
| 5,634,051 A | 5/1997 | Thomson |
| 5,638,486 A | 6/1997 | Wang et al. |
| 5,640,103 A | 6/1997 | Petsche et al. |
| 5,646,630 A | 7/1997 | Sheynblat et al. |
| 5,649,065 A | 7/1997 | Lo et al. |
| 5,652,570 A | 7/1997 | Lepkofker |
| 5,657,487 A | 8/1997 | Doner |
| 5,663,734 A | 9/1997 | Krasner |
| 5,672,106 A | 9/1997 | Orford et al. |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,701,328 A | 12/1997 | Schuchman et al. |
| 5,710,328 A | 1/1998 | Spivey et al. |
| 5,710,758 A | 1/1998 | Soliman et al. |
| 5,710,918 A | 1/1998 | Lagarde et al. |
| 5,717,406 A | 2/1998 | Sanderford et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A | 3/1998 | Kauser et al. |
| 5,727,057 A | 3/1998 | Emery et al. |
| 5,729,549 A | 3/1998 | Kostreski et al. |
| 5,732,074 A | 3/1998 | Spaur et al. |
| 5,732,354 A | 3/1998 | MacDonald |
| 5,736,964 A | 4/1998 | Ghosh et al. |
| 5,737,431 A | 4/1998 | Brandstein et al. |
| 5,740,048 A | 4/1998 | Abel et al. |
| 5,740,549 A | 4/1998 | Reilly et al. |
| 5,742,509 A | 4/1998 | Goldberg et al. |
| 5,742,905 A | 4/1998 | Pepe et al. |
| 5,752,186 A | 5/1998 | Malackowski et al. |
| 5,754,955 A | 5/1998 | Ekbatani |
| 5,764,756 A | 6/1998 | Onweller |
| 5,774,670 A | 6/1998 | Montulli |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,802,454 A | 9/1998 | Goshay et al. |
| 5,802,492 A | 9/1998 | DeLorme et al. |
| 5,802,518 A | 9/1998 | Karaev et al. |
| 5,805,670 A | 9/1998 | Pons et al. |
| 5,809,415 A | 9/1998 | Rossmann |
| 5,815,538 A | 9/1998 | Grell et al. |
| 5,815,808 A | 9/1998 | Valentine |
| 5,815,814 A | 9/1998 | Dennison et al. |
| RE35,916 E | 10/1998 | Dennison et al. |
| 5,816,919 A | 10/1998 | Scagnelli et al. |
| 5,819,273 A | 10/1998 | Vora et al. |
| 5,819,301 A | 10/1998 | Rowe et al. |
| 5,822,539 A | 10/1998 | van Hoff |
| 5,830,069 A | 11/1998 | Soltesz et al. |
| 5,832,367 A | 11/1998 | Bamburak et al. |
| 5,835,857 A | 11/1998 | Otten |
| 5,835,904 A | 11/1998 | Vicik et al. |
| 5,835,907 A | 11/1998 | Newman |
| 5,838,562 A | 11/1998 | Gudat et al. |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,848,397 A | 12/1998 | Marsh et al. |
| 5,857,181 A | 1/1999 | Augenbraun et al. |
| 5,862,481 A | 1/1999 | Kulkarni et al. |
| 5,864,313 A | 1/1999 | Speck et al. |
| 5,864,755 A | 1/1999 | King et al. |
| 5,867,495 A | 2/1999 | Elliott et al. |
| 5,867,780 A | 2/1999 | Malackowski et al. |
| 5,867,799 A | 2/1999 | Lang et al. |
| 5,870,029 A | 2/1999 | Otto et al. |

(56) References Cited

U.S. PATENT DOCUMENTS

| | | |
|---|---|---|
| 5,872,539 A | 2/1999 | Mullen |
| 5,873,040 A | 2/1999 | Dunn et al. |
| 5,873,076 A | 2/1999 | Barr et al. |
| 5,873,782 A | 2/1999 | Hall |
| 5,875,394 A | 2/1999 | Daly et al. |
| 5,875,401 A | 2/1999 | Rochkind |
| 5,881,226 A | 3/1999 | Veneklase |
| 5,883,598 A | 3/1999 | Parl et al. |
| 5,890,068 A | 3/1999 | Fattouche et al. |
| 5,890,172 A | 3/1999 | Borman et al. |
| 5,892,441 A | 4/1999 | Woolley et al. |
| 5,893,091 A | 4/1999 | Hunt et al. |
| 5,895,436 A | 4/1999 | Savoie et al. |
| 5,901,358 A | 5/1999 | Petty et al. |
| 5,903,844 A | 5/1999 | Bruckert et al. |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,921,865 A | 7/1999 | Scagnelli et al. |
| 5,924,090 A | 7/1999 | Krellenstein |
| 5,926,133 A | 7/1999 | Green, Jr. |
| 5,930,699 A | 7/1999 | Bhatia |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,937,352 A | 8/1999 | Courtney et al. |
| 5,938,721 A | 8/1999 | Dussell et al. |
| 5,943,014 A | 8/1999 | Gilhousen |
| 5,945,948 A | 8/1999 | Buford et al. |
| 5,946,618 A | 8/1999 | Agre et al. |
| 5,948,040 A | 9/1999 | DeLorme et al. |
| 5,949,815 A | 9/1999 | Pon |
| 5,952,969 A | 9/1999 | Hagerman et al. |
| 5,959,568 A | 9/1999 | Woolley |
| 5,961,572 A | 10/1999 | Craport et al. |
| 5,963,866 A | 10/1999 | Palamara et al. |
| 5,966,658 A | 10/1999 | Kennedy, III et al. |
| 5,969,673 A | 10/1999 | Bickley |
| 5,973,643 A | 10/1999 | Hawkes et al. |
| 5,977,913 A | 11/1999 | Christ |
| 5,978,799 A | 11/1999 | Hirsch |
| 5,978,840 A | 11/1999 | Nguyen et al. |
| 5,982,324 A | 11/1999 | Watters et al. |
| 5,982,891 A | 11/1999 | Ginter et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 5,999,808 A | 12/1999 | LaDue |
| 6,009,334 A | 12/1999 | Grubeck et al. |
| 6,014,102 A | 1/2000 | Mitzlaff et al. |
| 6,021,371 A | 2/2000 | Fultz |
| 6,023,241 A | 2/2000 | Clapper |
| 6,026,304 A | 2/2000 | Hilsenrath et al. |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,058,250 A | 5/2000 | Harwood et al. |
| 6,061,064 A | 5/2000 | Reichlen |
| 6,064,339 A | 5/2000 | Wax et al. |
| 6,064,942 A | 5/2000 | Johnson et al. |
| 6,073,013 A | 6/2000 | Agre et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Ishizuka et al. |
| 6,104,815 A | 8/2000 | Alcorn et al. |
| 6,108,555 A | 8/2000 | Maloney et al. |
| 6,115,611 A | 9/2000 | Kimoto et al. |
| 6,122,520 A | 9/2000 | Want et al. |
| 6,138,003 A | 10/2000 | Kingdon et al. |
| 6,138,026 A | 10/2000 | Irvin |
| 6,154,745 A | 11/2000 | Kari et al. |
| 6,157,621 A | 12/2000 | Brown et al. |
| 6,167,274 A | 12/2000 | Smith |
| 6,185,427 B1 | 2/2001 | Krasner et al. |
| 6,202,023 B1 | 3/2001 | Hancock et al. |
| 6,236,365 B1 | 5/2001 | LeBlanc et al. |
| 6,240,285 B1 | 5/2001 | Blum et al. |
| 6,243,587 B1 | 6/2001 | Dent et al. |
| 6,249,245 B1 | 6/2001 | Watters et al. |
| 6,249,252 B1 | 6/2001 | Dupray |
| 6,295,502 B1 | 9/2001 | Hancock et al. |
| 6,301,463 B1 | 10/2001 | Dao et al. |
| 6,304,833 B1 | 10/2001 | Ferkinhoff et al. |
| 6,308,072 B1 | 10/2001 | Labedz et al. |
| 6,317,718 B1 | 11/2001 | Fano |
| 6,321,092 B1 | 11/2001 | Fitch et al. |
| 6,324,404 B1 | 11/2001 | Dennison et al. |
| 6,330,452 B1 | 12/2001 | Fattouche et al. |
| 6,363,138 B1 | 3/2002 | Aprile |
| 6,381,464 B1 | 4/2002 | Vannucci |
| 6,385,541 B1 | 5/2002 | Blumberg et al. |
| 6,438,380 B1 | 8/2002 | Bi et al. |
| 6,496,776 B1 | 12/2002 | Blumberg et al. |
| 6,519,232 B1 | 2/2003 | Becher |
| 6,519,463 B2 | 2/2003 | Tendler |
| 6,522,875 B1 | 2/2003 | Dowling et al. |
| 6,529,143 B2 | 3/2003 | Mikkola et al. |
| 6,549,130 B1 | 4/2003 | Joao |
| 6,549,768 B1 | 4/2003 | Fraccaroli |
| 6,571,279 B1 | 5/2003 | Herz et al. |
| 6,594,483 B2 | 7/2003 | Nykanen et al. |
| 6,650,902 B1 | 11/2003 | Richton |
| 6,677,894 B2 | 1/2004 | Sheynblat et al. |
| 6,683,538 B1 | 1/2004 | Wilkes, Jr. |
| 6,707,421 B1 | 3/2004 | Drury et al. |
| 6,751,626 B2 | 6/2004 | Brown et al. |
| 6,754,482 B1 | 6/2004 | Torabi |
| 6,813,501 B2 | 11/2004 | Kinnunen et al. |
| 6,834,195 B2 | 12/2004 | Brandenberg et al. |
| 6,839,628 B1 | 1/2005 | Tu |
| 6,845,400 B2 | 1/2005 | Macpherson et al. |
| 6,873,850 B2 | 3/2005 | Dowling et al. |
| 6,950,876 B2 | 9/2005 | Bright et al. |
| 6,952,101 B2 | 10/2005 | Gupta |
| 6,952,181 B2 | 10/2005 | Karr et al. |
| 7,047,019 B1 | 5/2006 | Cox et al. |
| 7,171,189 B2 | 1/2007 | Bianconi et al. |
| 7,228,140 B2 | 6/2007 | Anctil et al. |
| 7,245,910 B2 | 7/2007 | Osmo |
| 7,274,332 B1 | 9/2007 | Dupray |
| 7,336,964 B2 | 2/2008 | Casey |
| 7,714,778 B2 | 5/2010 | Dupray |
| 7,764,231 B1 | 7/2010 | Dupray et al. |
| 8,694,025 B2 * | 4/2014 | Dupray .................. G06Q 30/02 342/451 |
| 9,078,101 B2 * | 7/2015 | Dupray .................. G06Q 30/02 |
| 2001/0022558 A1 | 9/2001 | Dupray et al. |
| 2001/0039210 A1 | 11/2001 | ST-Denis |
| 2001/0044309 A1 | 11/2001 | Bar |
| 2002/0016831 A1 | 2/2002 | Peled et al. |
| 2002/0035605 A1 | 3/2002 | McDowell et al. |
| 2002/0111154 A1 | 8/2002 | Eldering et al. |
| 2003/0032409 A1 | 2/2003 | Hutcheson et al. |
| 2003/0040324 A1 | 2/2003 | Eldering et al. |
| 2003/0126250 A1 | 7/2003 | Jhanji |
| 2003/0146871 A1 | 8/2003 | Dupray et al. |
| 2003/0148774 A1 | 8/2003 | Naghian et al. |
| 2003/0222820 A1 | 12/2003 | Dupray et al. |
| 2004/0198386 A1 | 10/2004 | Dupray |

(56) References Cited

U.S. PATENT DOCUMENTS

| | | | |
|---|---|---|---|
| 2008/0132214 | A1 | 6/2008 | Dupray et al. |
| 2009/0094164 | A1 | 4/2009 | Fontaine et al. |

FOREIGN PATENT DOCUMENTS

| | | |
|---|---|---|
| EP | 0689369 | 12/1995 |
| EP | 0811296 | 12/1997 |
| EP | 0870203 | 10/1998 |
| EP | 0923817 | 6/1999 |
| GB | 1605207 | 10/1983 |
| GB | 2155720 | 9/1985 |
| JP | H09-055803 | 2/1997 |
| JP | 10-013961 | 1/1998 |
| WO | WO 93/04453 | 3/1993 |
| WO | WO 94/01978 | 1/1994 |
| WO | WO 94/11853 | 5/1994 |
| WO | WO 94/15412 | 7/1994 |
| WO | WO 94/27161 | 11/1994 |
| WO | WO 95/34177 | 12/1995 |
| WO | WO 96/14588 | 5/1996 |
| WO | WO 96/20542 | 7/1996 |
| WO | WO 97/01228 | 1/1997 |
| WO | WO 97/22888 | 6/1997 |
| WO | WO 97/24010 | 7/1997 |
| WO | WO 97/26061 | 7/1997 |
| WO | WO 97/26750 | 7/1997 |
| WO | WO 97/38540 | 10/1997 |
| WO | WO 97/41654 | 11/1997 |
| WO | WO 97/50002 | 12/1997 |
| WO | WO 98/00982 | 1/1998 |
| WO | WO 98/02824 | 1/1998 |
| WO | WO 98/08314 | 2/1998 |
| WO | WO 98/10307 | 3/1998 |
| WO | WO 98/14018 | 4/1998 |
| WO | WO 98/30297 | 7/1998 |
| WO | WO 98/46035 | 10/1998 |
| WO | WO 98/59506 | 12/1998 |
| WO | WO 99/33293 | 7/1999 |
| WO | WO 99/45732 | 9/1999 |
| WO | WO 99/51038 | 10/1999 |
| WO | WO 00/04730 | 1/2000 |
| WO | WO 00/29979 | 5/2000 |
| WO | WO 00/41090 | 7/2000 |
| WO | WO 00/41412 | 7/2000 |
| WO | WO 00/50844 | 8/2000 |
| WO | WO 01/26393 | 4/2001 |
| WO | WO 01/44998 | 6/2001 |
| WO | WO 01/75705 | 10/2001 |
| WO | WO 01/95642 | 12/2001 |
| WO | WO 02/065250 | 8/2002 |

OTHER PUBLICATIONS

U.S. Appl. No. 08/246,149, filed May 19, 1994, Lepkofker.
U.S. Appl. No. 08/355,901, filed Dec. 13, 1994, Schoen.
U.S. Appl. No. 60/017,269, filed May 13, 1996, Maloney.
U.S. Appl. No. 60/017,899, filed May 17, 1996, Maloney.
U.S. Appl. No. 60/025,855, filed Sep. 9, 1996, Leblanc.
U.S. Appl. No. 60/035,691, filed Jan. 16, 1997, Maloney.
U.S. Appl. No. 60/038,037, filed Feb. 7, 1997, Christ.
"ARGOS: Basic Description of the Argos System," ARGOS, 7 pages.
"Location Systems and Technologies," 1994, Wireless Emergency Services JEM Report, Annex A pp. 42-46 and Appendix A pp. 1-2.
"Services Beyond Airtime," Release concerning RadioCamera™, available at http:/www.uswcorp.com/laby.htm, printed Sep. 14, 1998, 10 pages.
Abowd et al., "A Mobile context-Aware Tour Guide," Sep. 23, 1996, Baltzer Journals.
Abowd et al., "A Mobile context-Aware Tour Guide," Wireless Networks, vol. 3, 1997, pp. 421-433.
Baldazo, "Navigating with a Web Compass: Quarterdeck Harnessess Leading-edge "Metasearch" Technology to Create a Smart Agent that Searches the Web and organizes the Results," BYTE, Mar. 1996, pp. 97-98.
Bass, Tim, "Intrusion Detection Systems and Multisensor Data Fusion: Creating Cyberspace Situational Awareness," Communications of the ACM, date unknown.
Beck et al., "Simulation Results on the Downlink of a Qualcomm-like DS-CDMA-System Over Multipath fading channels," Sep. 1994, pp. 1-7.
Botafogo, "Cluster Analysis for Hypertext Systems," ACM-SIRIG, Jun. 1993, pp. 116-124.
Brumitt et al., "EasyLiving: Technologies for Intelligent Environments," 2000, pp. 1-12.
Caffery et al., "Overview of Radiolocation in CDMA Cellular Systems," IEEE Communications Magazine, Apr. 1998, pp. 38-45.
Caffery et al., "Radio Location in Urban CDMA Microcells," International Symposium on Personal, Indoor, and Mobil Radio Communications, Sep. 1995, 5 pages.
Caffery, J. et al., "Vehicle Location and Tracking for IVHS in CDMA Microcells," International Symposium on Personal, Indoor, and Mobile Radio Communications, Sep. 1994, pp. 1227-1231.
Callan, James P. et al., "Searching Distributed Collections With Inference Networks," 18th Annual International ACM SIGIR Conference on Research and Development in Information Retrieval, 1995.
Campadello et al., "Using Mobile and Intelligent Agents to Support Nomadic Users," 6th International Conference of Intelligence in Networks (ICIN2000), Jan. 17-20, 2000, Bordeaux, France.
Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation", filed Sep. 25, 1996.
Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.
Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.
Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.
Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.
Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.
Before the Federal Communications Commission, in the Matter of Revision of the Commission's Rules to Ensure Compatibility with Enhanced 911 Emergency Calling Systems; ex parte communication from XYP0INT Corporation, Inc. received Jul. 28, 1997 by the Commission.
Chan et al., "Multipath Propagation Effects on a CDMA Cellular System," IEEE, 1994, pp. 848-855.
Cheverst et al., "Experiences of Developing and Deploying a Context-Aware Tourist Guide: The GUIDE Project; "Mobile Computing Networking 2000, pp. 20-31 (url = "citeseer.ist.psu.edu/cheverst00experiences.html").

(56) References Cited

OTHER PUBLICATIONS

Cheverst, et al. "Using context as a Crystal Ball: Rewards and Pitfalls," Distributed Multimedia Research Group, Pub. Yr. 2000, Dept. of Computing, Lancaster University, Lancaster, LA14YR, U.K., 5 pages.
Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.
Dailey, D.J., et al., "ITS Data Fusion," Final Research Report, Research Project T9903, Task 9, ATIS/ATMS Regional IVHS Demonstration, University of Washington, Apr. 1996.
Dartmouth College, "Soldiers, Agents and Wireless Networks: A Report on a Military Application," PAAM 2000.
Dey, "Understanding and Using Context," Personal and Ubiquitous Computing Journal, vol. 5(1), 2001., pp. 4-7.
Driscoll, "Wireless Caller Location Systems," GSP World Advanstar Communications, Inc., 1998, www.gpsworld.com/1198/1198driscol.html, pp. 1-8.
Dutta et al., "Modified Adaptive Multiuser Detector for DS-CDMA in Multipath Fading," Prior to Dec. 22, 1997, pp. 1-7.
Ergon Proprietary, "Performance Analyses Brief: Microminiature Emergency Locator Systems (MELS)," May 1996.
Evans, "New Satellites for Personal Communications," Scientific American, 1998, vol. 278(4), pp. 70-77.
Fechner et al., "A Hybrid Neural Network Architecture for Automatic Object Recognition," IEEE, 1994, pp. 187-194.
Fels et al., "Progress of C-Map: A Context-Aware Mobile Assistant," ATR Media Integration & Communication Research Laboratories, Seida-cho, Soraku-gun, Kyoto, 619-02, Japan, Publication year 1998.
Gaspard et al., "Position Assignment in Digital Cellular Mobile Radio Networks (e.g. GSM) derived from Measurements at the Protocol Interface," Prior to Dec. 22, 1997, pp. 1-5.
Goldsmith et al., "A Measurement-Based Model for Predicting Coverage Areas of Urban Microcells," IEEE, 1993, pp. 1013-1023.
Goodman, "The Wireless Internet: Promises and Challenges," IEEE, 2000, pp. 1-6.
Hills, "Terrestrial Wireless Networks," Scientific American, 1998, vol. 278(4), pp. 86-91.
Ichitsubo et al., "A Statistical Model for Microcellular Multipath Propagation Environment," Prior to Dec. 22, 1997, Wireless Systems Laboratories, pp. 1-6.
Iida et al. "Multi-Agent Architecture for Seamless Personal Communications," NetMedia Research Center, Fujitsu Laboratories Ltd., 1999, pp. 1-7.
Iwayama et al., "Cluster-Based Text Categorization: A Comparison of Category Search Strategies," ACM-SIGIR, 1995, pp. 273-279.
Johnson, "Smart Technology Busting Out All Over Web," Electronic Engineering Times, Jun. 15, 1998, vol. 1012, pp. 1-6.
Junius et al., "New Methods for Processing GSM Radio Measurement Data: Applications for Locating, Handover, and Network Management," Communication Network, 1994, Aachen University of Technology, pp. 338-342.
Karanta, Ilkka, "Intelligent Agents in Mobile Services", VTT Information Technolgy, Oct. 2, 1997.
Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.
Kosko, "Fuzzy Systems as Universal Approximators," IEEE, 1994, pp. 1329-1333.
Lawrence et al., "Northern Light Search Engine Leads the Pack—Others Fall Behind," Online Newsletter, May 1, 1998, vol. 19(5), pp. 1-2.
Long et al., "Rapid Prototyping of Mobile Context-Aware Applications: The Cyberguide Case Study," 2nd ACM International Conference on Mobile Computing and Networking, 1996 (MobiCom '96).
Loran, "Users Handbook 1992 Edition," U.S. Coast Guard, Radionavigation Division, 1992, 28 pages.
Low, "Comparison of Urban Propagation Models with CW-Measurements," IEEE Deutsche Bundespost Telekom, 1992, pp. 936-942.
Mardiraju et al., "Neural Networks for Robust Image Feature Classification: A Comparative Study," IEEE, 1994, pp. 423-430.
Marmasse et al., "Location-aware Information Delivery with cornMotion," Mit Media Laboratory, 20 Ames Street, Cambridge, MA 02139, USA, Publication: HUC 2000 Proceeding, pp. 157-171, publication year 2000.
Meadow, "Text Information Retrieval Systems," Academic Press, 1992, pp. 204-209.
Miller, RT, et al., "Protein fold recognition by sequence threading: tools and assessment techniques," Journal Announcement, Department of Biochemistry and Molecular Biology, University College, London, United Kingdom, Jan. 1996.
Mynatt et al., "Designing Audio Aura," published in CHI '98 Conference Proceedings, 1998.
Newton, "The Near-Term Potential of Doppler Location," John Hopkins APL Technical Digest, 1981, pp. 16-31.
Notess, "Internet Search Engine Update," Online, Jul. 1, 1998, vol. v22:nr, pp. 1-3.
Orphanoudakis, C.E. et al., "I2 Cnet: Content-Based Similarity Search in Geographically Distributed Repositories of Medical Images," Computerized Medical Imaging and Graphics, 1996, vol. 20(4), pp. 193-207.
Pascoe et al., "Human-Computer-Giraffe Interaction: HCI in the Field," Workshop on Human Computer Interaction with Mobile Devices, Glasgow, Scotland, 1998.
Pelton, "Telecommunications for the 21st Century," Scientific American, 1998, vol. 278(4), pp. 80-85.
Pitoura et al., "Locating Objects in Mobile Computing," IEEE, 2001, pp. 1-43.
Pop et al., "Site Engineering for Indoor Wireless Spread Spectrum Communications," Jun. 2001, 3 pages.
Ramanathan et al., "A Survey of Routing Techniques for Mobile Communications Networks," Mobile Networks and Applications, Oct. 1996, vol. 1(2), pp. 1-31.
Randell et al, "The Shopping Jacket: Wearable Computing for the Consumer", Personal Technologies, 4, 2000, pp. 241-244.
Rizzo et al., "Integration of Location Services in the Open Distributed Office," Technical Report 14-94, Computing Laboratory, University of Kent, Cantebury, United Kingdom, Aug. 1994, pp. 1-14.
Salcic, "AGPCS—An Automatic GSM-based Positioning and Communication System," Proceedings of GeoComputation 1997 & SIRC 1997, Aug. 1997, pp. 15-22.
Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.
Smith, Jr., "Passive Location of Mobile Cellular Telephone Terminals," IEEE, CH3031-2/91/0000-0221, 1991, pp. 221-225.
Sobol "Callback Security," Information Security Journal: A clobal Perspective, 1992, vol. 1, No. 1, pp. 23-26.
Sousa et al., "Delay Spread Measurements for the Digital Cellular Channel in Toronto," IEEE, 1994, pp. 837-847.
Spiteri et al., "An Architecture to Support Storage and Retrieval of Events," Proceedings of Middleware 1998, IFIP International Conference on Distributed Systems Platfors and Open Distributed Processing, Lancaster, UK, Sep. 1998.
Striglis et al., "A Multistage RAKE Receiver for Improved Capacity of CDMA Systems," IEEE Vehicular Technology Conference, 1994, pp. 1-5.
Stutzmann et al., "Moving Beyond Wireless Voice Systems," Scientific American, 1998, vol. 278(4), pp. 92-93.
Wang Baldonado et al., "SenseMaker: An Information-Exploration Interface Supporting the Contextual Evolution of a User's Interests," ACM-CHI, 1997, pp. 11-18.
Weiss et al., "HyPursuit: A Hierarcical Network Search Engine that Exploits Content-Link Hypertext Clustering," Hypertext, 1996, pp. 180-193.

(56) References Cited

OTHER PUBLICATIONS

Wittenben et al., "A Low Cost Noncoherent Receiver with Adaptive Antenna Combining for High Speed Wireless Lans," Prior to Dec. 22, 1997, ASCOM Systec AG, pp. 1-4.
Wolfle et al., "Field Strength Prediction in Indoor Environments with Neural Networks," Prior to Dec. 22, 1997, pp. 1-5.
Wylie et al., "The Non-Line of Sight Problem in Mobile Location Estimation," Proc. IEEE ICUPC, 1996, pp. 827-31.
Official Action for U.S. Appl. No. 10/857,565, mailed May 9, 2011.
Official Action for U.S. Appl. No. 10/857,565, mailed Jan. 31, 2012.
Official Action for U.S. Appl. No. 13/561,846, mailed Sep. 11, 2012.
Official Action for U.S. Appl. No. 13/561,846, mailed Jun. 20, 2013.
Notice of Allowance for U.S. Appl. No. 13/561,846, mailed Nov. 20, 2013.
Official Action for U.S. Appl. No. 14/228,951, mailed Jun. 19, 2014.
Notice of Allowance for U.S. Appl. No. 14/228,951, mailed Mar. 3, 2015.
International Search Report for International (PCT) Application No. PCT/US00/40989 dated Mar. 19, 2001.

\* cited by examiner

NETWORK SERVICES DEPENDENT UPON GEOGRAPHICAL CONSTRAINTS

CROSS REFERENCE TO RELATED APPLICATIONS

The present application is a continuation of U.S. patent application Ser. No. 14/228,951, filed Mar. 28, 2014, which is a continuation of U.S. patent application Ser. No. 13/561,846, filed Jul. 30, 2012 (now U.S. Pat. No. 8,694,025), which is a continuation of U.S. patent application Ser. No. 10/857,565, filed May 28, 2004, which is a continuation of U.S. patent application Ser. No. 09/669,255, filed Sep. 25, 2000, and which claims the benefit of U.S. Provisional Patent Application No. 60/156,066 filed Sep. 24, 1999. All of the above references are incorporated herein by this reference.

RELATED FIELD OF THE INVENTION

The present invention relates to verifying geographic locations of users on a communications network, e.g., for determining whether to provide a product or service to such users, and in particular, the present invention is useful for determining whether a product or service can be legitimately provided to an Internet user by determining the Internet user's geographic location when the product or service is requested.

BACKGROUND

Geographically extensive communication networks such as the Internet are substantially viewed as being geographicless in the sense that such networks extend across substantially all national and all local country, state, and political boundaries. Accordingly, it has been difficult to monitor and/or provide certain services on networks, such as the Internet, due to the network not having sufficient capability for respecting such boundaries. Moreover, while legal statutes may cause certain network sites to be restricted in their network services due to the site's geographical location being within the jurisdiction for such statutes, other network sites outside of the area to which the statutes apply may have an unfair advantage in that the prohibited services can be offered to substantially all network users from such latter network sites, In particular, the above described general scenario applies to gambling on the Internet in that, e.g., Internet sites within the United States are prohibited, in general, from offering wagering on games such as blackjack, poker, pai gow, craps and roulette due to gambling restrictions in various U.S. states and/or counties or other legal jurisdictions.

Additionally, other communication network services are also either not available or not appropriately restricted due to the lack of being able to locate and/or verify the locations of network users. In particular, certain software products have been determined by various governments to be restricted in their dissemination across national boundaries. Accordingly, if network users could have their locations verified, then such restrictions in the downloading of software from the Internet could be better enforced. Additionally, by verifying a location of a network user, network services could be effectively taxed according to the user's location when purchasing a network service such as the downloading of software via the Internet.

Moreover, by verifying a network user's location, a network site in communication with the user may be able to adapt its services and/or display to present to the user relevant information and services related to a geographical area within which the user is determined to be located. For example, an Internet website can utilize a verification of a user's location for selecting or prioritizing: (a) a list of additional websites offering services that are available near the user's location, and/or (b) advertising of services or products locally available to the user. Note that the verification (or more precise determination) of a user's location in the present context may be particularly important for wireless Internet users who are traveling and/or who do not know their current location. For example, providing such an Internet website for the travel industry, allows a user to access the website from different locations (via, e.g., different hotel Internet connections, or via a mobile wireless Internet connection), and subsequently select locally related advertising and other local information such as locally preferred restaurants, locations of scenic sites, a listing of local events, etc. based on the user's location and optionally the date and time (as contemplated by the present invention).

Accordingly, it would be desirable to have a network based capability for geographically verifying and/or more precisely determining the location of network users for allowing, restricting, and/or selecting network services according to each user's location.

SUMMARY

The present invention is a method and system for determining or verifying the geographic location of a user while the user is communicating on a communications network such as the Internet. The user's location can be straightforwardly determined by a provider of a product or service requested by the user during network communications between the user and the provider. Thus, the user's location can be determined at the time the service or product is requested by the provider.

In one embodiment of the present invention, to determine the location of the user's network station (and thus locating the user), the provider: (a) receives the user's phone number (or other identification for contacting the user's station), and (b) supplies the user's station with a distinctive identifier. Additionally, the provider supplies a location determining service with the user's phone number (or other identification) requesting that the location determining service determine the location of the network station having the phone number. Moreover, a phone call is made to the phone number for retrieving the distinctive identifier from the network station having the phone number. If the distinctive identifier is retrieved and the location determining service indicates that the user's station is within an appropriate geographical area (or not within an inappropriate area), then the provider can provide the requested product or service to the user.

Thus, the present invention is a location determining service for verifying, or more precisely determining, the location of users on a communications network such as the Internet. In particular, embodiments of the network based location system of the present invention combine network (e.g. Internet) services with telephony location services that are available for locating telephone users. In particular, such user location capabilities are widely used for emergency services such as 911. Moreover, enhancements in location technologies have extended the traditional landline based location services to also include users on wireless devices such as cellular or wireless telephones.

Thus, it is an aspect of the present invention, as related to one embodiment using the Internet, to combine: (a) Internet communications between, e.g., a website and a user with (b) additional telephony based communications between the website and the user for verifying the location of the user prior to providing and/or selecting the services that the website offers to the Internet user. in particular, the present invention transmits a unique identifier to an Internet user whose location is to be verified, and subsequently causes the Internet user to place a conventional telephony call to a predetermined phone number for transmitting the identification (provided in the initial Internet transmission to the Internet user). Subsequently, upon picking up the call placed by the Internet user to the predetermined number, the callee (e.g., the website) captures both the Internet user's telephone number and the transmitted identification. The transmitted identification is used to retrieve previously stored information about the Internet user, and in particular, a user's previously input general geographical location (e.g., the country, state or city within which the user has indicated he/she is located), and associate the user information with the Internet user's captured phone number.

Subsequently, the user's general location is used to identify a telephony location providing service having coverage for the user specified general geographical area of the Internet user for thereby determining or verifying a relatively precise location of the user, and providing this information to the website so that appropriate services can be selected for providing to the Internet user.

In one embodiment of the present application, the following steps are performed for determining the location of a user requesting services from a network site of a communications network:

Step 1: receiving, at the network site, user information for identifying the user, and a first approximate location of the user;

Step 2: determining, using the first approximate location of the user, a location service provider providing coverage for the first approximate user location;

Step 3: causing the user's network station to call a predetermined telephone number for identifying the user;

Step 4: receiving the user's call at the predetermined telephone number, and: (a) capturing the user's telephone number, and (b) obtaining identification information for identifying the user;

Step 5: transmitting the user's telephone number to one of the telephony location service providers selected for determining a location of the user; and Step 6: receiving from the selected telephony location service provider, a more precise location of the user; and determining services to be provided to the user on the communications network according to the more precise location.

Accordingly, a method and system are disclosed for determining the geographic location of a user communicating on a communications network such as the Internet. In one embodiment, a provider of a product or service: (a) receives the user's phone number (or other identification for contacting the user's station), and (b) supplies the user's station with a distinctive identifier. The provider of the product or service then supplies a location determining service (or location service provider) with the user's phone number (or other identification). A phone call is made to the phone number by the location determining service (or location service provider) for retrieving the distinctive identifier from the network station having the phone number. If the distinctive identifier is retrieved and the location determining service (or location service provider) determines that the user's station is within an appropriate geographical area (or not within an inappropriate area), then the provider of the product or service can provide the requested product or service to the user.

Other features and benefits of the present invention will become evident from the accompanying drawings and the detailed description herein below.

DETAILED DESCRIPTION

Figure 1:
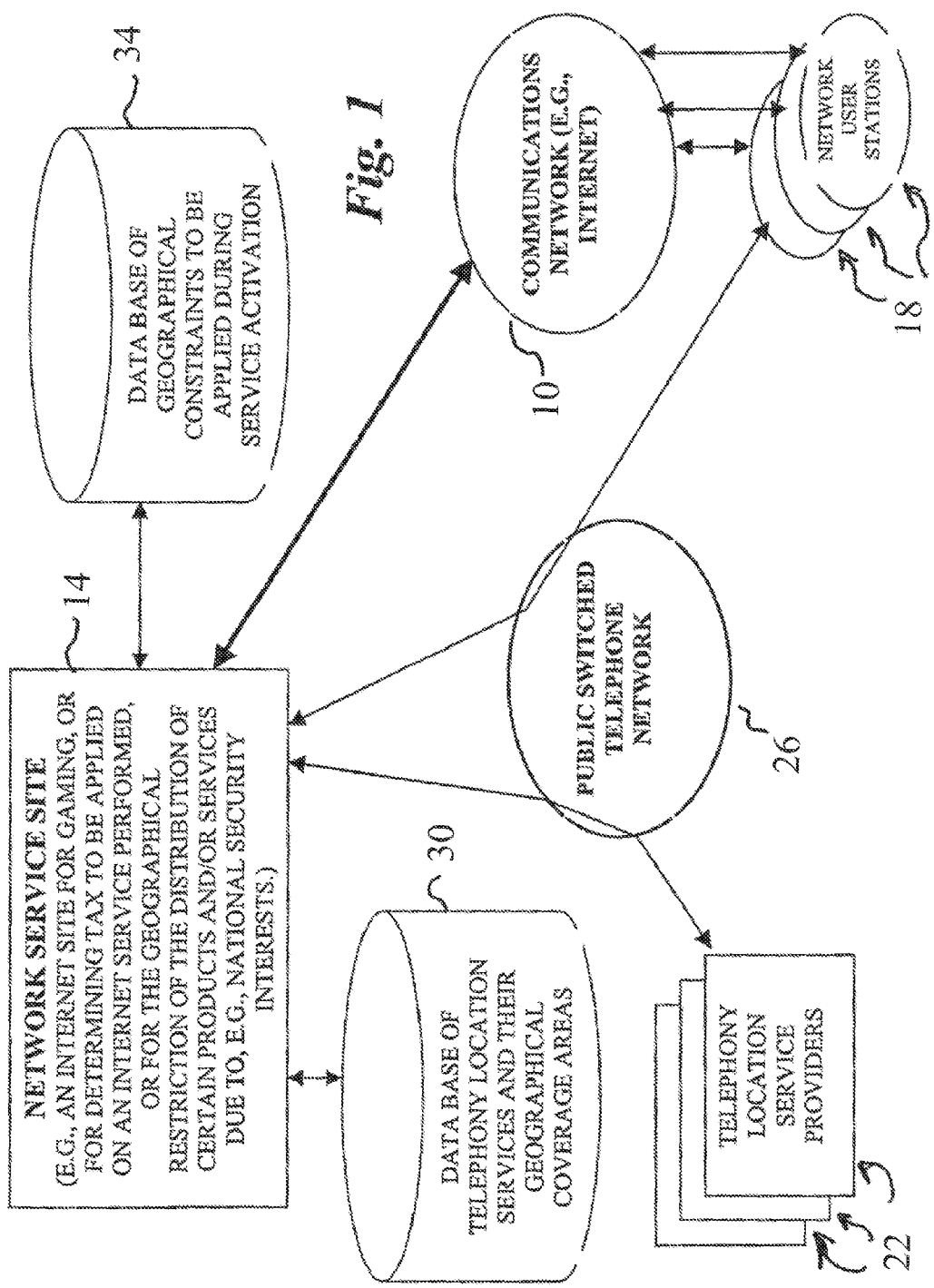
FIG. 1 is a block diagram showing the high level components used in an embodiment of the present invention wherein the communications network is, for example, the Internet.

FIG. 1 shows a high level diagram of the components used in an embodiment of the present invention. Accordingly, a communications network 10, such as the Internet, is used for providing network based services between a network service site 14 and one or more network user stations 18 whose locations are desired to be verified (or determined) one or more times by the network service site 14. Additionally, one or more telephony location service providers 22 are in communication with the network site 14, via one or more public switched telephone networks 26, wherein the network service site 14 provides the telephone numbers of users (at their stations 18) who are to have their locations determined. Accordingly, the telephony location service providers 22 respond with locations of the network users. Note that such telephony location service providers 22 are currently available for providing the location of telephony subscribers for emergency services such as 911. Moreover, various technologies have been developed for also verifying the location of users on cellular or wireless phones such as global positioning location technologies, time difference of arrival triangulation technologies, angle of arrival technologies, and multipath pattern matching technologies for wireless signals as one skilled in the art will understand. Moreover, as one skilled in the art will also understand, the automatic location identification (ALI) currently used for emergency 911 services can also be used for providing location services to other location requesters such as the network service site 14.

The network service site 14 also accesses a database 30 of telephony location service providers 22, wherein the database associates each location service provider with their corresponding geographical coverage area for providing locations of users. This database is used to select an appropriate location service provider 22 given the general area in which the network user has indicated he/she is located. Additionally, the network service site 14 also accesses a database 34 having any geographical constraints to be applied during service activation with a user once the user's location has been verified (e.g., gambling wagering limitations according to the user's location). Moreover, note that in addition to geographical constraints, the database 34 may also include geographically associated advertising and additional information to provide to the user depending upon the user's verified location.

Figure 2A:
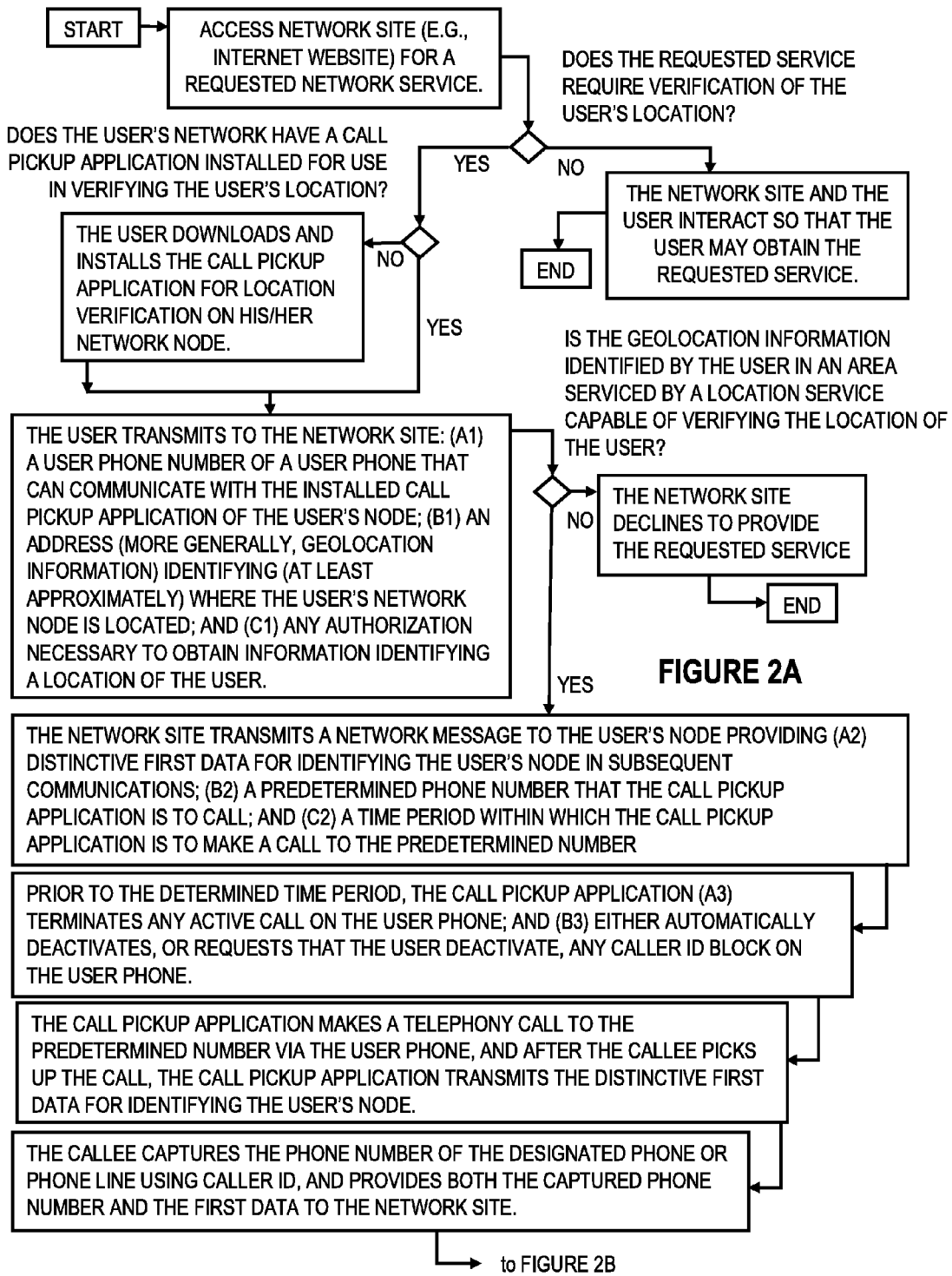
FIGS. 2A and 2B provide a flowchart of the high level steps performed at a network service site (e.g., an Internet website), and at a user's network station for verifying the location of the user.
Figure 2B:
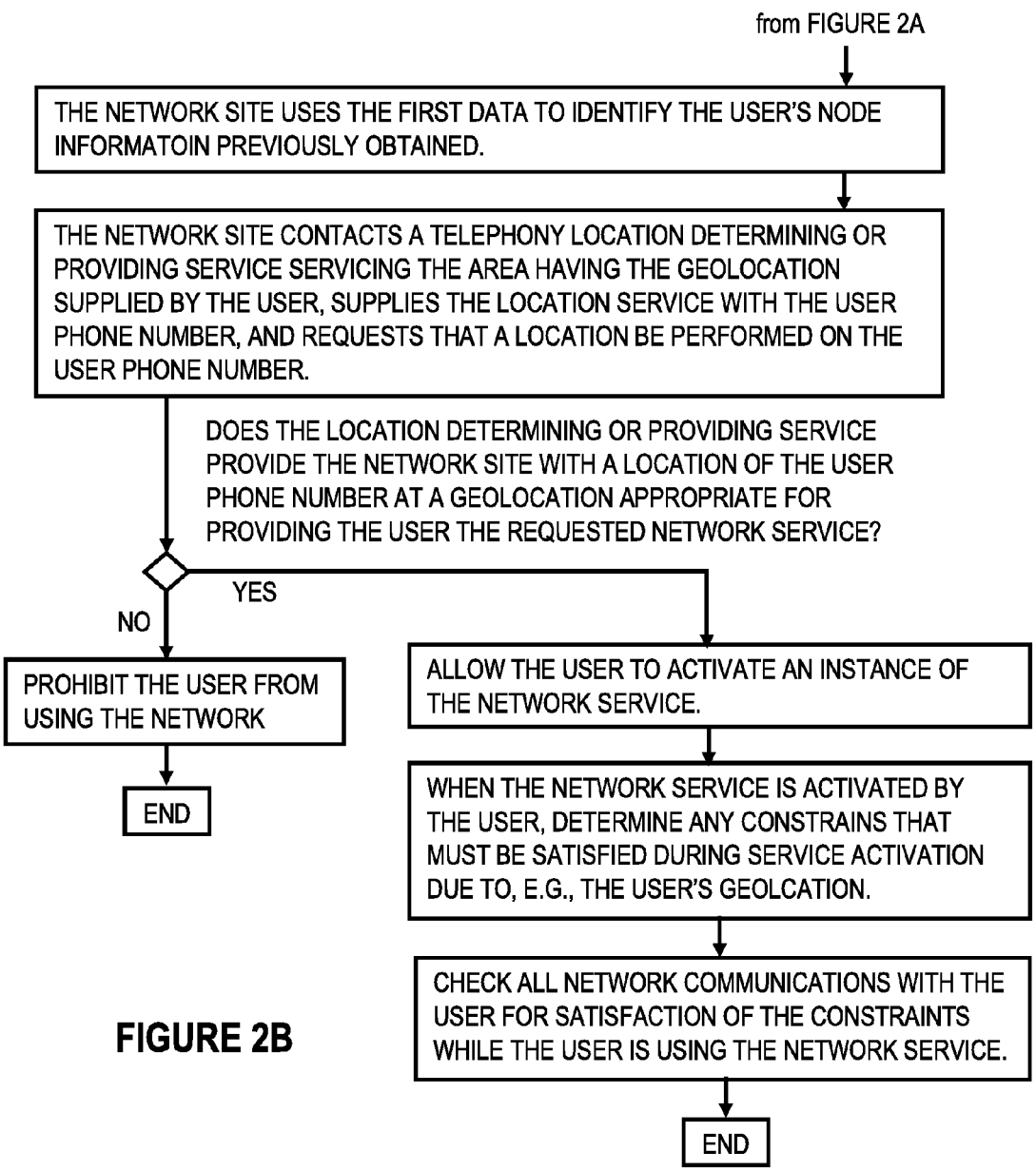

A general high level flowchart illustrating the steps performed by the present invention is provided in the flowchart of FIGS. 2A and 2B. Note that this flowchart describes the steps performed when a network user request a particular service. However, as one skilled in the art will understand, a similar flowchart can be provided for substantially unrequested services as advertising of locally available products and/or services. The foregoing discussion of the invention has been presented for purposes of illustration and description. Further, the description is not intended to limit the invention to the form disclosed herein. Consequently, variations and modifications commensurate with the above teachings, and within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention, It is intended that the appended claims be construed to include alternative embodiments to the extent permitted by the prior art.

What is claimed is:

1. A method for providing a location of a user or a network station, the network station for providing wireless network communications, comprising performing by computational equipment the following (a) through (f), wherein one or more networks are accessed wirelessly by the network station from a plurality of different network station locations;

(a) receiving, via a first network communication from the network station, first identification information for identifying the user or the network station;

(b) transmitting, via a second network communication, second identification information to the network station for storing thereon and distinctively identifying the user or the network station;

(c) receiving, from the network station via a third network communication, the second identification information;

(d) using the received second identification information to identify the user or the network station using the first identification information;

(e) requesting a location of the network station when the first identification information is identified; and (f) receiving, in response to the requesting, a more precise location of the network station than a first approximate location for the network station, wherein a location provider or determiner, activated according to the first approximate location, determines the more precise location, the location provider or determiner determining the more precise location using one of: a global positioning location technology, a wireless signal time difference of arrival location technology, a wireless signal angle of arrival location technology, and a wireless signal pattern matching location technology.

2. The method of claim 1, wherein the location provider or determiner is activated using the first approximate location for the network station.

3. The method of claim 1, further including determining one or more services to be provided to the user according to the more precise location.

4. The method of claim 3, wherein the services include providing advertising to the network station based on the more precise location.

5. The method of claim 3, wherein the services include selecting or prioritizing particular services, offered by one or more network sites, the particular services based on the more precise location, wherein the selecting or prioritizing includes obtaining information for identifying websites that offer services near the more precise location.

6. The method of claim 1, further including determining whether the second identification information is retrieved from the network station in order to perform the using the received second identification information of (d) in claim 1.

7. The method of claim 3, wherein the services include selecting or prioritizing network sites based on the more precise location, wherein the selecting or prioritizing includes obtaining advertising information for identifying products or services that are available near to the more precise location.

8. The method of claim 1, further including requesting the second identification information from the network station prior to (c) of claim 1.

9. The method of claim 1, wherein the first approximate location for the network station is used for selecting the location provider or determiner for determining the more precise location.

10. The method of claim 1, further including identifying a location provider or determiner from a plurality of location providers or determiners for determining the more precise location.

11. The method of claim 1, wherein the method is performed at a time a product or service is requested via an Internet transmission by the user.

12. A method for providing a location of a network station, the network station for providing network communications, comprising performing by computational equipment the following (a) through (f), wherein one or more networks are accessed by the network station from a plurality of different locations;

(a) receiving, via a first network communication from the network station, first identification information for identifying the network station or a user therefor;

(b) transmitting, via a second network communication, second identification information to the network station for storing thereon and distinctively identifying the network station or the user therefor;

(c) receiving, from the network station via a third network communication, the second identification information;

(d) using the received second identification information to identify the first identification information;

(e) requesting a location of the network station when the first identification information is identified; and (f) receiving, in response to the requesting, a more precise location of the network station than a wireless coverage for the network station, wherein a location provider or determiner, activated according to a first approximate location for the network station, determines the more precise location, the location provider or determiner obtaining the more precise location using one of: a wireless signal time difference of arrival location technology, a wireless signal angle of arrival location technology, and a wireless signal pattern matching location technology;

wherein the network station includes a wireless device for communicating on the Internet during a performance of (a) through (f).

13. The method as claimed in claim 12, wherein said network communications are directed to one or more of: services for games, taxation services, services for the distribution of software, advertising presentations, and information related to locations within a local geographical area, wherein the user is expected to find the information of interest.

14. The method of claim 12, wherein the location provider or determiner is selected using the first approximate location for the network station.

15. The method of claim 12, wherein the location provider or determiner is selected according to a wireless coverage area for the location provider or determiner.

16. The method of claim 12, further including determining one or more services to be provided to the user according to the more precise location.

17. The method of claim 12, further including determining whether the second identification information is retrieved from the network station in order to perform the transmitting.

18. The method of claim 12, wherein a first approximate location is used for selecting the location provider or determiner for obtaining the more precise location.

19. The method of claim 12, further including identifying the location provider or determiner from a plurality of location providers or determiners for determining the more precise location.

20. The method of claim 16, wherein at least one of the services is presented to the user via an Internet website, wherein the Internet website includes local information to the more precise location, the local information including at least one of: locally related advertising, locally preferred establishment, local point of interest, and local event.

21. A method for providing a location of a network station for providing network communications therewith, comprising performing by electronic equipment the following (a) through (d), wherein one or more networks are accessed by the network station from a plurality of different locations;
    wherein identification information is transmitted, via a network communication, to the network station for storing thereon and distinctively identifying the network station or a user therefor;
    (a) receiving, from the network station via a network communication, the identification information;
    (b) using the received identification information to identify the network station or the user therefor;
    (c) requesting a location of the network station when the network station or the user therefor is identified; and
    (d) receiving, in response to the requesting, a more precise location of the network station than a first approximate location for the network station, wherein a location provider or determiner, activated dependent upon first approximate location, obtains the more precise location, the more precise location determined using one of: a global positioning location technology, a wireless signal time difference of arrival location technology, a wireless signal angle of arrival location technology, and a wireless signal pattern matching location technology.

22. The method of claim 21, wherein the location provider or determiner determines the more precise location using the wireless signal pattern matching location technology.

23. The method of claim 21, wherein the location provider or determiner is activated using the first approximate location for the network station.

24. The method of claim 21, further including determining one or more services to be provided to the user according to the more precise location.

25. The method of claim 24, wherein the services include providing advertising to the network station based on the more precise location.

26. The method of claim 24, wherein the services include selecting or prioritizing particular services, offered by one or more network sites, the particular services based on the more precise location, wherein the selecting or prioritizing includes obtaining information for identifying websites that offer services near the more precise location.

27. The method of claim 21, further including determining whether the second identification information is retrieved from the network station in order to perform the using the received second identification information of (c) in claim 21.

28. The method of claim 24, wherein the services include selecting or prioritizing network sites based on the more precise location, wherein the selecting or prioritizing includes obtaining advertising information for identifying products or services that are available near to the more precise location.

29. The method of claim 21, further including requesting the second identification information from the network station prior to (b) of claim 21.

30. The method of claim 21, wherein the first approximate location for the network station is used for selecting the location provider or determiner for determining the more precise location.

31. The method of claim 21, further including identifying a location provider or determiner from a plurality of location providers or determiners for determining the more precise location.

32. The method of claim 21, wherein the method is performed at a time a product or service is requested via an Internet transmission by the user.

33. The method of claim 21, wherein the location provider or determiner is selected according to a wireless coverage area for the location provider or determiner.

34. The method of claim 21, further including determining one or more services to be provided to the user according to the more precise location.

35. The method of claim 34, wherein at least one of the services is presented to the user via an Internet website, wherein the Internet website includes local information to the more precise location, the local information including at least one of: locally related advertising, locally preferred establishment, local point of interest, and local event.

* * * * *